Nov. 15, 1960 W. A. MAINBERGER 2,960,663

FREQUENCY CONTROL APPARATUS

Filed June 26, 1958 3 Sheets-Sheet 1

Fig. I

INVENTOR.
WALTER A. MAINBERGER
BY KENWAY, JENNEY, WITTER & HILDRETH
ATTORNEYS

Nov. 15, 1960 W. A. MAINBERGER 2,960,663

FREQUENCY CONTROL APPARATUS

Filed June 26, 1958 3 Sheets-Sheet 2

INVENTOR.
WALTER A. MAINBERGER
BY KENWAY, JENNEY, WITTER & HILDRETH

ATTORNEYS

Nov. 15, 1960 W. A. MAINBERGER 2,960,663

FREQUENCY CONTROL APPARATUS

Filed June 26, 1958 3 Sheets-Sheet 3

INVENTOR.
WALTER A. MAINBERGER
BY KENWAY, JENNEY, WITTER & HILDRETH

ATTORNEYS

United States Patent Office 2,960,663

Patented Nov. 15, 1960

2,960,663

FREQUENCY CONTROL APPARATUS

Walter A. Mainberger, Winchester, Mass., assignor to National Company, Inc., Malden, Mass., a corporation of Massachusetts Filed June 26, 1958, Ser. No. 744,729

12 Claims. (Cl. 331—3)

My invention relates to apparatus for the control of the frequency of an oscillator with respect to a frequency standard. More particularly it relates to improved apparatus for controlling an oscillator frequency when the frequency standard to which the controlled oscillator is referred exhibits a plurality of resonant peaks. Frequency standards of this type include atomic beam tubes and gas absorption cells, for example.

It has heretofore been known that atomic beam tubes, gas cells and the like may be used as extremely accurate frequency standards. For this use a frequency derived from a controllable oscillator is applied to the frequency standard. The standard has at least one resonance frequency and, if the applied frequency is the resonance frequency of the standard, a detector associated with the standard will indicate a maximum or a minimum signal. If the frequency applied to the standard is other than the resonance frequency, the detector produces a signal less than the maximum (or greater than the minimum); this difference signal may be used in a feedback system as an error signal to control the oscillator frequency and return it to the value where it supplies exactly the resonance frequency. In this manner, the oscillator frequency is locked to the resonance frequency of the standard. Where the resonance frequency of the standard is invariant with temperature, pressure, humidity, time or other effects, as in atomic beam standards, and to a lesser extent in gas absorption cells, the oscillator frequency will then remain constant in spite of wide variations in these parameters.

While systems of the type described have been very successful in providing frequency standards of great stability, a problem has existed in initially adjusting the frequency control circuits. Many of the desirable frequency standards have a multiple peak resonance, and these multiple peaks cannot readily be distinguished from the true resonance. Thus, in initially "locking-in" the oscillator control circuit it is possible to set it at one of several different frequencies and appear to obtain proper operation. However, in general, it is desired to lock to one particular resonance, usually that one exhibiting the highest Q, since this resonance provides the greatest signal to noise ratio for the servo system and therefore greater stability.

In systems that have heretofore been developed for locking a controlled oscillator to the resonance frequency of an atomic beam tube standard, the oscillator output frequency, suitably multiplied has been frequency or phase modulated before being applied to the standard.

As used herein and in the claims the term "frequency modulation" is intended to include both frequency and phase-modulation. The frequency modulated signal, when applied to the frequency standard, produces a sharp minimum or null in the component of detector output at the modulating frequency when the center frequency of the modulated signal coincides with the resonant frequency. Such a signal is an ideal one for operation of a servomechanism for oscillator frequency control.

However, other peaks in the vicinity of the true resonance may also produce a null signal. It has also been found that the amplitude of the second harmonic component of the detector signal is greatest when the frequency modulated signal applied thereto is exactly at the true resonance frequency of the standard, and is somewhat less at the undesired resonance frequencies. It has heretofore been proposed to utilize the amplitude of this second harmonic signal as a warning of off-resonance lock by providing apparatus sensitive to the amplitude of the second harmonic signal. A system of this type is disclosed in greater detail in the copending application of Zacharias et al., Serial No. 693,104, filed October 28, 1957, and also assigned to the assignee of the present application.

While the system there disclosed is satisfactory for many purposes, the apparatus for sensing the level of the second harmonic component of detector signal is subject to possible errors as a result of aging and variability of components, and the other difficulties inherent in any level sensing apparatus.

Also, in the prior systems it was not, in general, possible to compensate for phase lags introduced in the error signal between the time it is applied as modulation to the signal impressed on the frequency standard and the time it is used as an error signal. Since a two phase motor is generally used as a servomotor to drive the oscillator frequency control, it is important that the error signal applied to one phase of the two phase motor be exactly 90° out of phase with the reference signal from the modulation generator applied to the other phase so that maximum torque will be produced. While an accurate 90° relative phase shift could be introduced between the modulating signal and the detector signal with comparative ease, there was no accurate means in prior systems for adjusting the phase of the reference signal to compensate for any phase changes which may have been suffered by the modulating signal in passing through the beam tube and its associated circuitry.

Accordingly, it is a principal object of my invention to provide improved apparatus for the control of the frequency of an oscillator which is referred to as a multiple resonance standard.

Another object of my invention is to provide apparatus of the type described which provides an indication of frequency error dependent upon phase sensitive apparatus rather than amplitude sensitive apparatus.

A further object of my invention is to provide apparatus of the type described which permits adjustment of the servomechanism used for frequency control for optimum response.

A still further object of my invention is to provide apparatus of the type described especially adapted for use with cesium beam tube frequency standards.

A still further object of my invention is to provide apparatus of the type described which will provide an indication of system failure.

Yet another object of my invention is to provide apparatus of the type described which is relatively simple and economical of construction and uses signal components already present in the beam tube.

Other and further objects of my invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of my invention, reference should be had to the following detailed description taken in connection with the accompanying drawings in which:

Figure 1(*b*) is a plot of the alternating component of beam tube detector output at the modulating frequency when a frequency-modulated signal is applied to the beam tube;

Figure 1(*c*) is a plot similar to Figure 1(*b*) of the alternating component of beam tube output at twice the modulating frequency;

Figure 1(*d*) is a plot similar to Figure 1(*b*) of the component of the detector output signal illustrated in Figure 1(*b*) which is in phase with the modulating signal;

Figure 1(*e*) is a plot similar to Figure 1(*b*) of the component of the detector output shown in Figure 1(*b*) which is in quadrature with the modulating signal;

Figure 1:
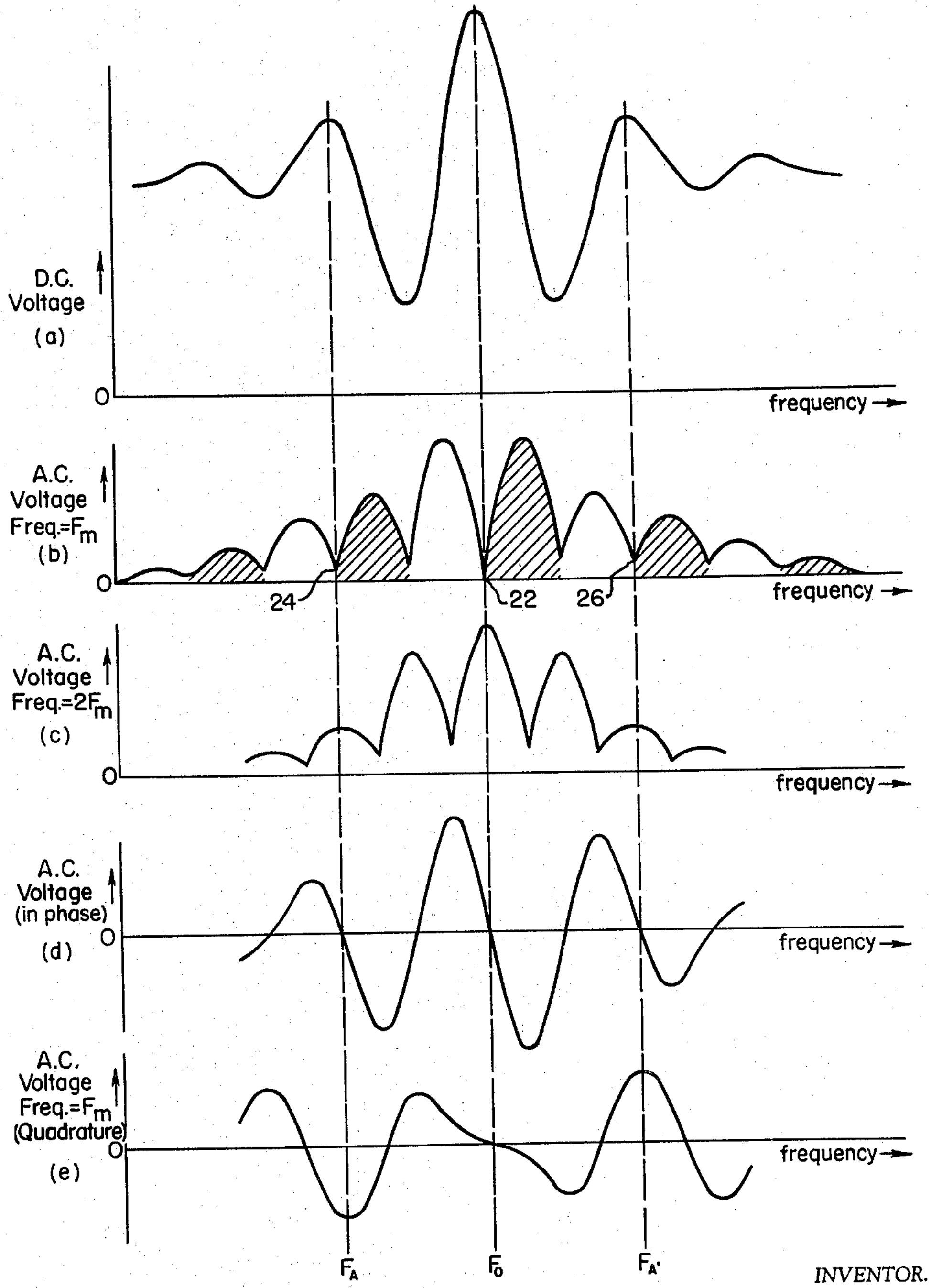
Figure 1(*a*) is a diagram illustrating the response of a cesium beam tube detector in direct volts as a function of the frequency impressed on the beam tube, the impressed frequency being unmodulated.

Referring first to Figure 1(*a*), I have here illustrated the response of a detector associated with a cesium beam tube of the type described in the Zacharias et al. application previously cited to an unmodulated frequency impressed thereon. It will be observed that if the frequency F*o* is applied to the beam tube, the detector produces a maximum output signal. If the frequency of the signal applied to the cesium beam tube is either increased above or decreased below the resonance frequency, F*o*, the detector output diminishes and as the deviation from resonance increases still further it rises again to the peaks at the frequencies labeled F*a* and F*a'*. Additional less pronounced peaks also occur as the frequency is deviated still further from resonance. Thus the cesium beam tube exhibits a multiplicity of resonant peaks, F*o*, F*a*, F*a'* etc. However, it is usually desired to use the device to lock an oscillator or other frequency generating means precisely on F*o* and erroneous locking on other frequencies is to be prevented.

While Figure 1 illustrates response curves for a cesium beam tube, it will be understood that my invention may be readily applied to other frequency standards than cesium beam tubes, which exhibit a multiple resonance characteristic similar to Figure 1(*a*).

Since it is difficult to sense the precise peak of the curve of Figure 1(*a*) and utilize differences from this peak value as the control signal for frequency control apparatus, the signal applied to the frequency standard is often modulated at a low frequency F*m* as for example 100 c.p.s.

Figure 2:
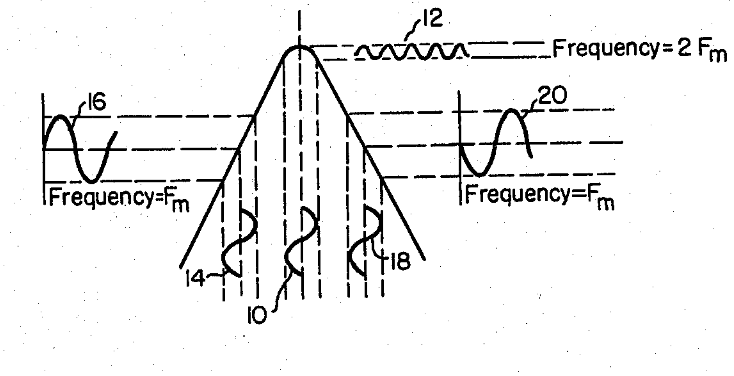
Figure 2 is a diagrammatic representation illustrating the manner in which a frequency modulated signal applied to a detector having the characteristic shown in Figure 1(*a*) produces the signals illustrated in Figures 1(*b*) and 1(*c*).

Figure 2 illustrates the signals which will be generated by a frequency modulated signal applied to a frequency standard having a characteristic such as that shown in Figure 1(*a*). A frequency modulated signal whose center frequency coincides with the resonance peak of the beam tube is indicated at 10 in Figure 2. As the applied signal varies in frequency, the voltage output from the detector caused by the applied signal will be as shown at 12 i.e. a signal at twice the modulating frequency. When the signal is substantially below the resonant frequency of the standard as indicated at 14 in Figure 2, then a signal such as that indicated at 16 will be generated by the detector. It will be observed that this signal is in phase with the modulating signal, but that no second harmonic will be generated if the sloping sides of the resonance curve are perfectly straight. In practice, of course, the sides of the curve are not perfectly straight and some second and higher harmonics will be generated. If the center frequency of the modulated signal applied to the beam tube is above the resonance frequency, as indicated by the signal at 18 in Figure 2, then the detector will provide the signal indicated at 20. It will be observed that the signal 20 is also a signal at the modulating frequency, but that it is 180° out of phase with the signal produced when the center frequency is below the resonance frequency. Thus, when a frequency modulated signal is applied to the frequency standard, and its center frequency is below the resonance frequency, the fundamental component of the detector signal will have the same frequency and phase as the modulated signal (16 in Figure 2). As the frequency is increased to the resonance frequency, the fundamental component decreases to zero leaving only a second harmonic signal (12 in Figure 2). Above the resonance frequency the fundamental component again increases, but is 180° out of phase with the applied modulation (20 in Figure 2).

The complete characteristic of a beam tube having the direct voltage characteristic shown in Figure 1(*a*) for a signal modulated at a frequency F*m* is illustrated in Figure 1(*b*). The amplitude of the alternating component of detector output at the modulating frequency F*m* is plotted as a function of the center frequency of the frequency modulated signal. The null to which reference has been made in the discussion of Figure 2 is indicated at 22, corresponding to the frequency F*o*. It will be observed that both above and below the point 22 the alternating voltage rises to a peak value. The shaded areas in Figure 1(*b*) indicate that the alternating voltage produced at these frequencies is 180° out of phase with the applied modulation. A plot similar to Figure 1(*b*) for the second harmonic output from the detector of the associated beam tube is given in Figure 1(*c*). It will be observed in general that the second harmonic reaches a maximum value when the fundamental component of detector signal is a minimum.

Because of the sharp null occurring at the frequency F*o* in Figure 1(*b*), the detector output signal may conveniently be used directly as the error signal for a servomechanism. If an in phase voltage at the modulating frequency is present, the servomechanism drive motor is arranged to drive in a direction to raise the oscillator frequency, while if an out of phase signal is present the drive motor of the servomechanism is arranged to drive to lower the oscillator frequency and bring it back to the null at 22. It will be noted however that there are nulls in the fundamental component of the detector output at signal frequencies F*a* and F*a'* previously mentioned. It should also be noted that frequencies lower than F*a* and F*a'* produce an error signal which is in phase with the modulating frequency while higher frequencies produce an out of phase signal. Thus, using a servomechanism of the type described, it is possible to lock the system at either of the frequencies F*a* or F*a'*.

As previously explained, in prior frequency control systems using multiple peak resonance devices, the two null values, those at the points 24 and 26 corresponding respectively to the frequencies F*a* and F*a'* were distinguished by the amplitude of the second harmonic signal as shown in Figure 1(*c*). It will be observed that the second harmonic signal at the frequencies F*a* and F*a'* is substantially lower in amplitude than that existing at the resonance peak F*o*. However, as previously mentioned, this method of distinguishing was not completely satisfactory.

Analysis of the fundamental signal produced by the beam tube as illustrated in Figure 1(*b*) indicates that the signal may be considered to be composed of two components at the modulating frequency F*m*. One of these components might be termed the in phase component while the other is a component whose phase is at 90° to the modulating signal and is herein termed the quadrature component. If the in phase component of the voltage illustrated in Figure 1(*b*) is plotted as a function of frequency, the diagram of Figure 1(*d*) results. In this curve the plot below the line represents a voltage which is 180° out of phase with the modulating voltage. Figure 1(*e*) is a similar plot of the quadrature component of the detector output signal at the fundamental frequency. It will be noted that both the quadrature component and the in phase component pass through a zero value at the resonance frequency F*o*. However, although the in phase component of the fundamental passes through zero at the frequencies F*a* and F*a'*, it will be noted that the quadrature component has a substantial value at these frequencies. It is for this reason that the characteristic shown in Figure 1(*b*) does not have a zero value at the frequencies F*a* and F*a'*, but merely a minimum value. I have found that by separating the in phase and quadrature components of the fundamental frequency signal produced by the detector, I can clearly differentiate between the peak at F*o* and the undesired peaks at F*a* and F*a'*, and I can also provide adequate and timely warning of errors. Apparatus made according to my invention also permits adjustment of the phase of the reference voltage supplied to the correcting servomechanism for optimum operation.

Figure 3:
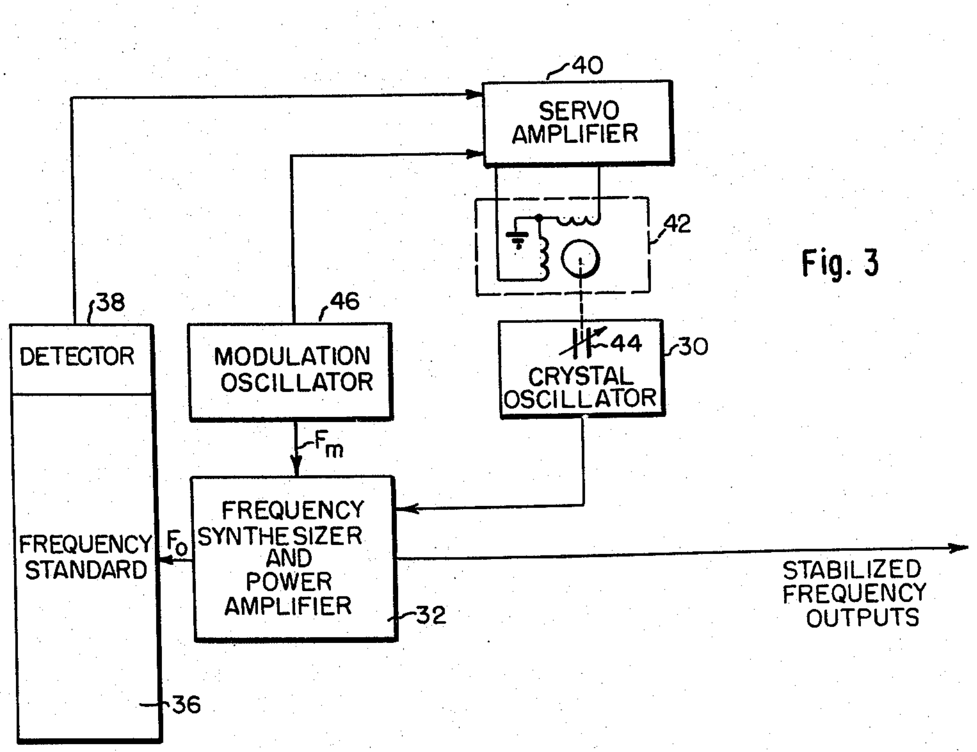
Figure 3 is a block and line diagram illustrating the general configuration of frequency control circuits used with frequency standards.

A generalized block diagram of a control system used with atomic beam tubes and other frequency standards is indicated in Figure 3. As shown therein, a crystal oscillator or like device 30 having means to control its frequency generates an electrical signal which is fed through a frequency synthesizer and power amplifier 32; the useful output from the system is taken from synthesizer and power amplifier 32. After being correctly multiplied to approximately the resonance frequency of the beam tube, or other frequency standard 36, the output of the frequency synthesizer and power amplifier 32 is applied to the standard. A detector 38, which is usually an integral part of the frequency standard, provides an output signal which is fed to the servo amplifier 40, the output of which feeds one phase of a two phase motor 42, or other device capable of accepting two signals and producing a correcting mechanical signal for the oscillators.

While I have found that a two phase servomotor is preferable for this application, it will be understood that a phase-sensitive demodulator and a D.C. servomotor might also be used for example. As used herein and in the claims, the term "two phase driving means" is intended to include any of the known combinations of electrical and electromechanical devices capable of accepting as input signals two alternating current signals of substantially the same frequency and producing an output signal, either electrical or mechanical, whose magnitude and direction is directly related to the relative phase of the two input signals.

Motor 42 rotates a variable condenser shown schematically at 44 to correct the frequency of the crystal oscillator and lock it with the resonance frequency of the standard.

As previously explained, in connection with Figure 1, it is desirable to frequency modulate the signal applied to the beam tube and this is done by a modulation oscillator 46. The modulation oscillator also energizes the other phase of the two phase servomotor 42 through the servoamplifier 40. A more detailed discussion of the typical circuit shown herein is given in the Zacharias et al. application previously cited.

Figure 4:
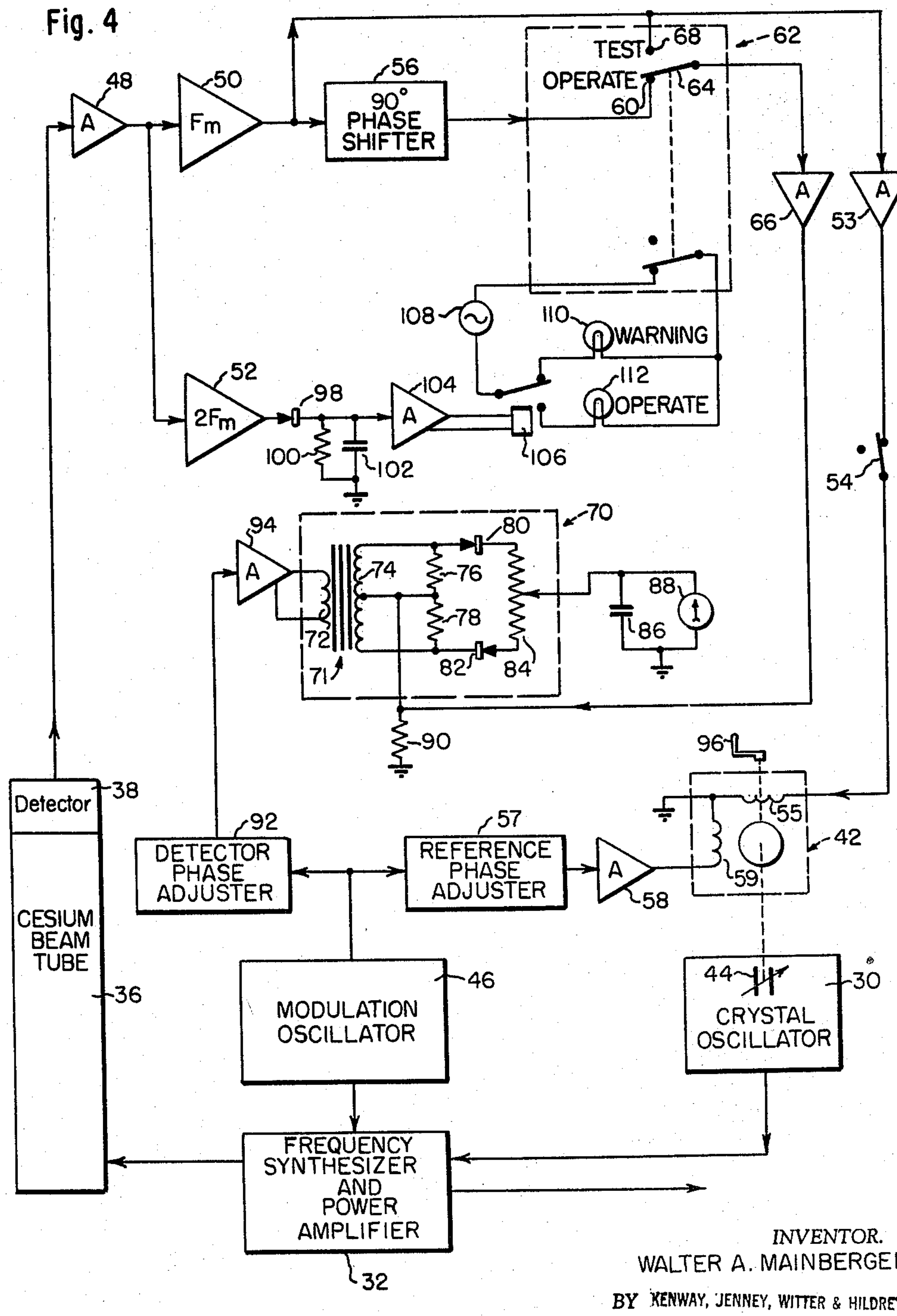
Figure 4 is a detailed block and diagram illustrating the improved frequency control circuit made according to my invention.

Turning now to Figure 4, I have here illustrated a complete frequency control system for a multiple peak resonance frequency standard which utilizes apparatus made according to my invention. It will be observed that the system includes a crystal oscillator 30, frequency synthesizer and power amplifier 32, a frequency standard 36, which in this case is shown as a cesium beam tube, and a detector 38 which performs the same function as previously described in connection with Figure 3. The modulation oscillator 46, motor 42 and capacitor 44 also perform the functions previously described.

In the apparatus of Figure 4 the output signal from the detector 38 is first amplified by the amplifier 48 and its output is connected to both amplifier 50 and amplifier 52. Amplifier 50 is a tuned amplifier, having a filter therein which is tuned to the modulation frequency F*m*. Similarly, amplifier 52 is a tuned amplifier tuned to the frequency 2F*m*. The filters associated with the amplifiers 50 and 52 are band pass filters. The approximate minimum Q of the filter in amplifier 50 is about 6 and that of the filter in amplifier 52 is 25. The output of amplifier 50 is connected via amplifier 53 to energize one winding 55 of the two phase servomotor 42. A switch 54 is included in this circuit for purposes to be hereinafter described.

The modulation oscillator 46 in addition to supplying a signal to the frequency synthesizer and power amplifier to modulate the frequency applied to the atomic beam tube, also is connected to a reference phase adjuster 57 the output of which is connected to amplifier 58. Amplifier 58 in turn energizes the so-called reference phase 59 of the two phase servomotor 42. The purpose of the reference phase adjuster 57 will be explained hereinafter.

The output of amplifier 50 is connected through means for shifting its phase by 90°, herein shown as a block 56 labeled "90° phase shifter." A fixed resistor capacitor network could be conveniently used for this purpose. The phase shifted output is connected to one terminal 60 of a double pole, double throw switch generally indicated at 62. In the "Operate" position of the switch 62, the swinger 64 engages the terminal 60 and connects the phase shifted output of amplifier 50 as an input to amplifier 66. In the "Test" position the swinger 64 of switch 62 connects the output of amplifier 50 directly to the amplifier 66 via the terminal 68.

The output of amplifier 66 is connected as one input to a phase sensitive detector generally indicated at 70. The phase sensitive detector includes a transformer generally indicated at 71 having a primary winding 72 and a center tapped secondary winding 74. The secondary winding of the transformer 71 is loaded with two substantially equal resistors 76 and 78 and the input signal from the amplifier 66 is connected to the center tap of the winding 74 and to the junction of the resistors 76 and 78. A pair of diodes 80 and 82 are connected between the secondary winding 74 of the transformer and the potentiometer 84. The slider of potentiometer 84 is grounded through a condenser 86 in parallel with a meter 88. It will be noted that the output of amplifier 66 is connected across a resistor 90 which provides a ground return for the center tap of transformer winding 74. The output of the modulation oscillator 46 is connected to the primary winding 72 of the transformer 71 via detector phase adjuster 92, whose purpose will be hereinafter discussed, and an amplifier 94.

In operation, the output of modulation oscillator 46 which is fed to the primary winding 72 of transformer 71 is rectified by the diodes 80 and 82 and a direct voltage accordingly is produced across the resistance portion of the potentiometer 84. The upper end of the resistance winding as shown in Figure 4 would be positive with respect to ground, while the lower end of the winding closest to diode 82, would be negative with respect to ground. With the input from amplifier 66 at zero, which is achieved for example by not applying power to the frequency standard, the slider of potentiometer 84 is adjusted until meter 88 reads zero. If a voltage which is at 90° with respect to the output of amplifier 94 is impressed on resistor 90 from amplifier 66, each diode will conduct for approximately half the impressed voltage cycle. Since each diode conducts for an equal time the voltage across the potentiometer winding will change from the value it had when a zero input was supplied from the amplifier 66. However, because the conduction is symmetrical, the center of the winding remains at zero potential with respect to ground, and meter 88 also remains at zero. However, if the phase of the voltage applied to resistor 90 with respect to the output of amplifier 94 is other than at 90° with respect to the output of the modulation oscillator 46, either diode 80 or diode 82 will conduct for a longer portion of the cycle, while the other diode will conduct for a shorter period. This unsymmetrical conduction causes a change in the relative value of the voltage on the potentiometer 84; i.e. either the entire potentiometer 84 will become more positive or more negative with respect to ground depending upon whether the voltage is closer to being in phase or 180° out of phase with the modulation oscillator. The change in the relative value of the voltage on the potentiometer 84 will be indicated by the deflection of meter 88. Since the meter 88 is preferably a zero-center ammeter its deflection will indicate both the amplitude and relative direction of the in phase component of voltage applied to resistor 90 by amplifier 66. The meter 88 will indicate a maximum signal when the voltage applied to resistor 90 is either in phase, or 180° out of phase with the output of amplifier 94. The condenser 86 performs a smoothing function and by-passes ripple voltage from the phase sensitive detector to ground. Thus the phase sensitive detector 70 is responsive only to components applied to it which are in phase with the reference voltage applied from the modulation oscillator and gives no indication of a quadrature component.

To adjust the control system shown herein for optimum operation, the servo loop controlling the frequency of the cesium beam tube 36 is opened by opening switch 54 thus opening the lead from the amplifier 53 to one phase of the servomotor 55. The frequency of the crystal oscillator 30 may then be controlled manually by means of the hand crank shown schematically at 96. Alternatively, a source of reversible phase alternating current may be connected to the off-normal contact of the switch 54 to permit electrical "manual" control of the crystal oscillator 30 by using drive motor 42.

While under manual control, the frequency of the crystal oscillator is varied with the switch 62 in the "Test" position. The meter 88 then indicates the magnitude and direction of the in phase component of detector output as shown in Figure 1(*d*). The amplitude of detector output near resonance is noted, and the detector phase adjuster 92, which may comprise a resistor and capacitor network, one or both of which are variable, is adjusted until the amplitude is a maximum. This insures that the reference signal applied to the phase detector 70 is exactly in phase with the in phase component of detector output.

The phase of the voltage supplied to servo motor 42 is now adjusted in the following manner. While still under manual control, the frequency of oscillator 30 is set to a frequency corresponding either to F*a* or F*a'* and switch 54 is then operated to close the servo loop. It will be noted in Figure 1, that at this frequency the only output from the detector is a quadrature component, and no in phase component is present. The reference phase adjuster 57, which may also consist of a variable resistor and capacitor network, is then adjusted while watching the meter 88. When the meter reads zero, the reference voltage supplied to the servo motor 42 is correctly phased with respect to the detector output.

This comes about for the following reasons. At the operating frequencies F*a* or F*a'* no in phase component is present but only a quadrature component. If the reference phase adjuster 57 is properly adjusted, the voltage applied to the winding 59 will be exactly at 90° with respect to the in phase component of detector output. This will insure proper operation of servo motor 42. However, at the frequencies F*a* or F*a'* when only a quadrature component is present on the winding 55, the motor will produce no torque since the quadrature component on the winding 55 will be either in phase or 180° out of phase with the reference voltage on the winding 59. If the voltage applied to the winding 59 is improperly phased, a torque will be created causing motor 42 to drive to change the frequency of oscillator 30. The motor will drive until the torques resulting from the detector 38 are equal and opposite. The meter 88, which is measuring the in phase component, will indicate the magnitude of the in phase component required to balance the quadrature component and will not read zero. By properly adjusting the reference phase adjuster 57, the voltage applied to the winding 59 may be set so that the meter 88 reads zero, indicating that the voltage on the winding 59 is exactly at 90° with respect to the in phase component of detector output.

Having adjusted the detector phase adjuster 92, and the reference phase adjuster 57, the system is now ready for operation. The loop is opened by operating the switch 54 and with switch 62 still in the "Test" position, the frequency of oscillator 30 is varied manually until the resonance frequency F*o* is reached as indicated by a zero reading on the meter 88. Switch 54 is then operated to close the servo loop. Switch 62 is now operated from the "Test" position to the "Operate" position. In so doing the swinger 64 engages contact 60, picking up the phase-shifted output of the amplifier 50 and applying it as an input signal to the phase sensitive detector 70. By phase-shifting the output signal from the detector 38 by 90°, the phase sensitive detector is now sensitive to the quadrature rather than the in phase component of detector output. Accordingly, if the meter 88 continues to read zero after switching from the "Test" to the "Operate" position, the resonance frequency has been correctly selected, since it is only at the resonance frequency that both the quadrature and in-phase components are zero. If, by accident, a resonance peak has been selected which is not correct, the meter 88 will deflect when switch 62 is thrown, indicating that the resonance peak either above or below the correct operating frequency has been selected.

So long as the system is operative, and the meter 88 continues to read zero, the operator is aware that the system is operating at the correct resonance frequency. The only possible ambiguity which can arise is from a system failure with a loss of signal in the beam tube. Under this condition, the meter 88 will continue to read zero although the system is not operating properly. To provide means for differentiating between these two conditions, I utilize the second harmonic component of the beam tube output to provide a warning indication of system failure. As shown in Figure 4, the output of amplifier 52, which is tuned to a frequency corresponding to the second harmonic output of the detector 38, is connected through a rectifying diode 98 to a filter which includes resistor 100 and capacitor 102. The direct voltage developed at the upper end of capacitor 102 is amplified by amplifier 104 and used to operate a relay 106. A source of electrical potential 108 is connected either across a "Warning" light 110 or an "Operate" light 112 through the contacts of the relay 106. It will be noted that one set of contacts of the Test-Operate switch 62 is also included in this circuit to disable the warning circuit when in the "Test" position. So long as some second harmonic is present at the input to amplifier 52, the relay 106 will be operated and the "Operate" light will be lighted indicating proper operation. However, if the second harmonic diminishes substantially, the relay will be released and the "Warning" light will be lighted. It should be noted that while I am using the second harmonic for indication of the presence or absence of a beam tube signal, my detector does not depend upon measuring the amplitude of the second harmonic with any precision. The fact that some second harmonic is present indicates that the system is operating. The correct operating frequency is determined by reference to meter 88. It is not necessary to differentiate, except very grossly, between two amplitudes of second harmonic.

It will thus be seen that I have provided an improved means for indicating proper operating conditions of an oscillator locked to a multiple peak resonance frequency standard with a feedback device. I have also provided apparatus for properly adjusting the phase of the reference voltage applied to two-phase driving means used to control the oscillator frequency, to thereby compensate for time lags which may exist in the frequency standard. By utilizing a phase sensitive detector and indicator to indicate off-resonance locking of the system, accurate level sensing of the second harmonic component is not required. Rather, a positive indication dependent on phase is provided. The second harmonic component is utilized in apparatus made according to my invention on a "go-no go" basis, however, to indicate the presence or absence of beam tube current. This use of the second harmonic is to be contrasted with prior devices where measurement of the amplitude of the second harmonic was necessary.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted in the illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A frequency control system comprising, in combination, a frequency standard, frequency controllable means for generating a signal to be applied to said standard, a modulation signal generator, means for frequency modulating the signal from said generating means with said modulation signal, means connecting said frequency modulated signal to said standard, a detector associated with said standard, means connecting the output of said detector to one phase of two phase driving means, means connecting said modulating signal to the other phase of said two phase driving means, means for controlling the frequency of said controllable frequency generator, means connecting said two phase driving means and said controlling means, a phase sensitive detector for measuring the in phase component of a signal applied thereto with respect to a reference signal, an indicator, means connecting the output signal of said phase-sensitive detector to said indicator, means connecting said modulating signal to said phase sensitive detector as a reference signal, means for shifting the phase of said detector output signal by 90°, switching means for connecting either said detector output signal or the output of said phase shifter as the other input to said phase sensitive detector, whereby said indicator may measure either the component of said detector output signal which is in phase with or in quadrature with said modulating signal.

2. The combination defined in claim 1 which includes means for amplifying the second harmonic component of said modulating signal in said detector signal, and means for indicating the presence of said second harmonic signal.

3. The combination defined in claim 1 which includes means for adjusting the phase of said modulating signal applied to one phase of said two phase driving means.

4. The combination defined in claim 1 which includes means for adjusting the phase of the modulating signal connected to said phase-sensitive detector.

5. The combination defined in claim 1 in which said two phase driving means includes a two phase servomotor.

6. A frequency control system comprising, in combination, a frequency standard, an oscillator, for controlling the frequency of said oscillator, means for multiplying the frequency of the output signal oscillator, means for multiplying the frequency of the output signal of said oscillator to substantially the resonant frequency of said standard, a modulation oscillator, means for frequency modulating the output signal of said frequency multiplier in accordance with the output signal of said modulation oscillator, means connecting said frequency modulated signal to said frequency standard, a detector associated with said frequency standard, two phase driving means, means connecting the output of said detector to one phase of said driving means, means connecting the output signal of said modulating oscillator to the other phase of said driving means, means connecting said driving means and said means for controlling the frequency of said oscillator, whereby said driving means may control said oscillator frequency, a phase sensitive detector for measuring the in phase component of a signal applied thereto with respect to a reference signal, an indicator, means connecting the output of said phase sensitive detector to said indicator, means connecting the output of said modulating oscillator as one input to said phase sensitive detector as a reference signal and switching means for connecting either said detector output signal or said detector output signal phase shifted by 90° as the other input to said phase sensitive detector.

7. The combination defined in claim 6 which includes means for amplifying the second harmonic component of said modulator signal in said detector signal, and means for indicating the presence of said second harmonic signal.

8. The combination defined in claim 6 in which the means connecting said modulation oscillator and said two phase driving means includes means for adjusting the phase of said modulation oscillator signal.

9. The combination defined in claim 6 which includes means for adjusting the phase of the modulation oscillator signal connected to said phase sensitive detector.

10. The combination defined in claim 6 which includes a band-pass filter whose center frequency is the frequency of said modulation oscillator connected between said detector and said phase sensitive detector.

11. A frequency control system comprising, in combination, a frequency standard, frequency controllable means for generating a signal to be applied to said standard, a modulation signal generator, means for frequency modulating the signal from said generating means with said modulation signal, means connecting said frequency modulated signal to said standard, a detector associated with said standard, means connecting the output of said detector to one phase of two phase driving means, means connecting said modulating signal to the other phase of said two phase driving means, said last-mentioned connecting means including means for adjusting the phase of said modulating signal, means for controlling the frequency of said controllable frequency generator, means connecting said driving means to said controlling means, a phase sensitive detector for measuring the in phase component of a signal applied thereto with respect to a reference signal, an indicator, means connecting the output signal of said phase-sensitive detector to said indicator, means connecting said modulating signal to said phase sensitive detector as a reference signal, said connecting means including means for adjusting the phase of said modulating signal, means for shifting the phase of said detector output signal by 90°, switching means for connecting either said detector output signal or the output of said phase shifter as the other input to said phase sensitive detector, whereby said indicator may measure either the component of said detector output signal which is in phase with or in quadrature with said modulating signal, means for amplifying the second harmonic component of said modulator signal in said detector signal, and means for indicating the presence of said second harmonic signal.

12. A frequency control system comprising, in combination, a beam tube frequency standard, an oscillator, means for controlling the frequency of said oscillator, means for multiplying the frequency of the output signal of said oscillator to substantially the resonant frequency of said beam tube, a modulation oscillator, means for frequency modulating the output signal of said frequency multiplier in accordance with the output signal of said modulation oscillator, means connecting said frequency modulated signal to said beam tube, a detector associated with said beam tube, two phase driving means, means connecting the output of said detector to one phase of said driving means, means connecting the output signal of said modulating oscillator to the other phase of said driving means, said connecting means including means for adjusting the phase of said modulation oscillator signal, means connecting said driving means and said means for controlling the frequency of said oscillator, whereby said driving means may control said oscillator frequency, a phase sensitive detector adapted to measure the in phase component of a signal applied thereto with respect to a reference signal, an indicator, means connecting the output of said phase sensitive detector to said indicator, means connecting the output of said modulating oscillator as one input to said phase sensitive detector as a reference signal, said connecting means including means for adjusting the phase of said modulation oscillator signal, switching means adapted to connect either said detector output signal or said detector output signal phase shifted by 90° as the other input to said phase sensitive detector, means for amplifying the second harmonic component of said modulator signal in said detector signal, and means for indicating the presence of said second harmonic signal.

References Cited in the file of this patent

UNITED STATES PATENTS 2,602,835 Hershberger ----------- July 8, 1952

UNITED STATES PATENT OFFICE

CERTIFICATE OF CORRECTION

November 15, 1960

Patent No. 2,960,663

Walter A. Mainberger

It is hereby certified that error appears in the printed specification of the above numbered patent requiring correction and that the said Letters Patent should read as corrected below.

Column 10, line 5, before "for" insert -- means --; line 7, before "oscillator" insert -- of said --.

Signed and sealed this 25th day of April 1961.

(SEAL)
Attest:

ERNEST W. SWIDER
Attesting Officer

DAVID L. LADD
Commissioner of Patents